United States Patent [19]

Tischer

[11] Patent Number: 4,900,108

[45] Date of Patent: Feb. 13, 1990

[54] SELF-FIXTURING CABINET CORNER MEMBER

[75] Inventor: James C. Tischer, La Crescent, Minn.

[73] Assignee: American Standard Inc., New York, N.Y.

[21] Appl. No.: 368,620

[22] Filed: Jun. 20, 1989

[51] Int. Cl.$^4$ ............................................. A47B 49/00
[52] U.S. Cl. ................... 312/265.3; 403/295; 312/265.4
[58] Field of Search ............ 312/265.1–265.5, 312/140, 263; 403/297, 295, 292, 172

[56] References Cited

U.S. PATENT DOCUMENTS

| | | | |
|---|---|---|---|
| 3,304,108 | 2/1967 | Hamilton et al. | 403/295 |
| 3,702,211 | 11/1972 | Young et al. | 312/257 |
| 4,691,970 | 9/1987 | Neri | 312/265.5 |
| 4,747,505 | 5/1988 | Hansen | 220/4 |
| 4,759,196 | 7/1988 | Davis | 62/326 |
| 4,776,484 | 10/1988 | Hansen | 220/345 |

FOREIGN PATENT DOCUMENTS

| | | | |
|---|---|---|---|
| 620483 | 8/1962 | Belgium | 312/265.4 |
| 2129858 | 12/1972 | Fed. Rep. of Germany | 403/295 |
| 972215 | 9/1948 | France | 312/140 |

Primary Examiner—Joseph Falk
Attorney, Agent, or Firm—William J. Beres; William O'Driscoll; Robert J. Harter

[57] ABSTRACT

A corner member for an air conditioning equipment cabinet includes a three-sided corner portion from which six discrete legs extend. The disposition of the legs and the existence of an open seam between two of the three sides of the corner portion of the corner member makes the corner member flexible and self-fixturing during the process of cabinet assembly yet results in an assembled cabinet which is both rigid and strong.

14 Claims, 2 Drawing Sheets

SELF-FIXTURING CABINET CORNER MEMBER

BACKGROUND OF THE INVENTION

The present invention relates to a structural component for a cabinet-like enclosure. More specifically, the present invention relates to a corner member for the framework of a cabinet of the type which typically encloses and supports heating, ventilating and air conditioning equipment on the rooftops and at the sides of buildings.

SUMMARY OF THE INVENTION

While heating, ventilating and air conditioning equipment cabinets are utilitarian in nature, functioning primarily to shelter and support active components of a heating, ventilating and air conditioning system, they are often conspicuous on rooftops and at the sides of buildings and therefore affect the perception of individuals with respect to the aesthetics of the building.

Such cabinets and their frameworks must provide a rigid, protective and strong structure for the purpose of properly mounting and sheltering equipment such as heat exchanger coils, fans, compressors filters and the like while providing sizeable side openings through which large volumes of air are directed. The cabinets must also support weighty accessories which extend outwardly from and are supported by the exterior of the cabinet structure. Such cabinet structures, which may weigh many thousands of pounds, must also be capable of being lifted to great heights while maintaining the structural integrity necessary to prevent the misalignment or damage of the cabinet itself or of the active air conditioning system components which they house.

Because air conditioning cabinets are highly visible and are often found in architecturally designed settings appearance as well as strength and rigidity are factors which must be taken into account in their design and fabrication. Further, the market for such equipment is a highly cost competitive one so that manufacturing efficiency and material costs are likewise important factors in cabinet design. Exemplary of cabinet structures and the nature of the accessories which they must support are U.S. Pat. No. 4,747,505; 4,759,196 and 4,776,484, all of which are assigned to the assignee of the present invention.

The framework for air conditioning cabinets have oftentimes been relatively expensive cast or extruded members which, while providing a pleasing appearance and a strong point of connection for other cabinet structural members, are expensive to produce. More significantly, such castings or extrusions are rigid and relatively inflexible, often resulting in the force-fit of components, accentuating misalignments in the overall cabinet structure and slowing the cabinet fabrication process making it more inefficient and expensive. Exemplary of extruded/cast cabinet components are those found in U.S. Pat. No. 3,702,211.

The need continues to exist for an enclosure, and a corner member in particular, for a heating, ventilating and air conditioning cabinet which contributes to an aesthetically pleasing cabinet appearance, is inexpensive of manufacture, is self-fixturing during the assembly process so as to facilitate cabinet assembly, yet which is extremely strong and rigid subsequent to the final assembly of the cabinet.

SUMMARY OF THE INVENTION

It is an object of the present invention to provide a structural member for a cabinet that houses heating, ventilating and air conditioning equipment which is self-fixturing during the cabinet assembly process.

It is another object of the invention to provide a corner member for an air conditioning cabinet which cooperates with other cabinet structural members to create a strong and rigid framework upon completion of the cabinet assembly process.

It is still a further object of the invention to provide a corner member for an air conditioning cabinet framework which is inexpensive of manufacture and which results in an aesthetically pleasing cabinet appearance yet which accommodates the attachment of other framework members which are square, rectangular, channel, angle or flat in cross section.

It is still another object of the present invention to provide a corner member for an air conditioning cabinet which accommodates the attachment of side panels as well as other cabinet framework structural members, all with the same fasteners.

These and other objects of the invention, which will become apparent when the Description of the Preferred Embodiment is considered, are accomplished by a cabinet corner member having three pair of attachment legs each pair of which extends in a different direction from one side of a three-sided corner portion. Each one of the three pair of legs is preferably in a plane parallel to but offset from the plane of the one of the three sides of the corner portion from which it extends.

Further, each one of each of the three pair of legs cooperates with and extends in the same direction as one of the legs of another of the three pair of legs to create a combined 90° attachment portion for other cabinet structural members. The two legged 90° attachment portions extend from the corner portion and accommodate the attachment of square, rectangular, angle, channel or other types of structural members.

Because each of the six legs extending from the corner portion is a discrete leg and because the corner portion is itself somewhat flexible due to the existence of an open seam between two of its three sides, the corner member of the present invention is extremely flexible and is self-fixturing during the cabinet assembly process yet the end result is a cabinet which is both strong and rigid.

Of particular significance is the self-fixturing nature of the corner member. The flexibility of the corner member permits and promotes the rapid and efficient assembly of an air conditioning cabinet in a manner which accommodates slight misalignments and minimizes the need to force-fit or otherwise stress members of the structure in order to finish the cabinet assembly process.

Cabinets employing the corner member of the present invention are, in their finished state, extremely strong and rigid. Further, the corner member of the present invention is capable of being fabricated from a single piece of material and therefore, in addition to minimizing assembly labor costs due to its self-fixturing nature, it minimizes cabinet material costs as it is economical to produce. Finally, because of the offset of the legs extending from the corner portion of the corner member a framework is created which contributes to the development of an aesthetically pleasing cabinet.

DESCRIPTION OF THE PREFERRED EMBODIMENT

Figure 1:
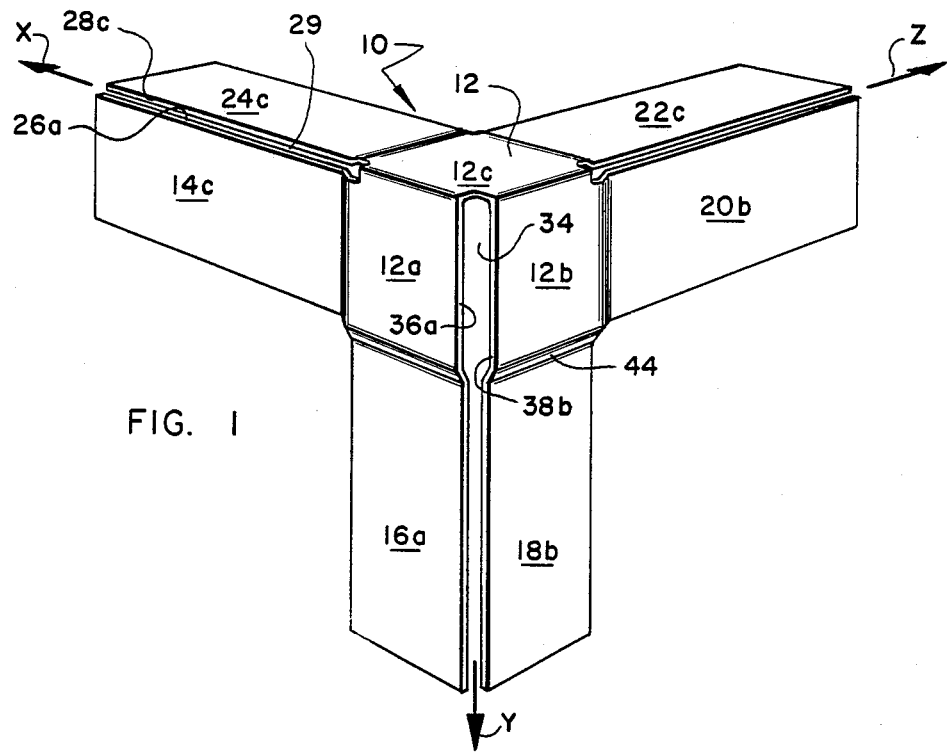
FIG. 1 is a perspective view of the corner member of the present invention.
Figure 2:
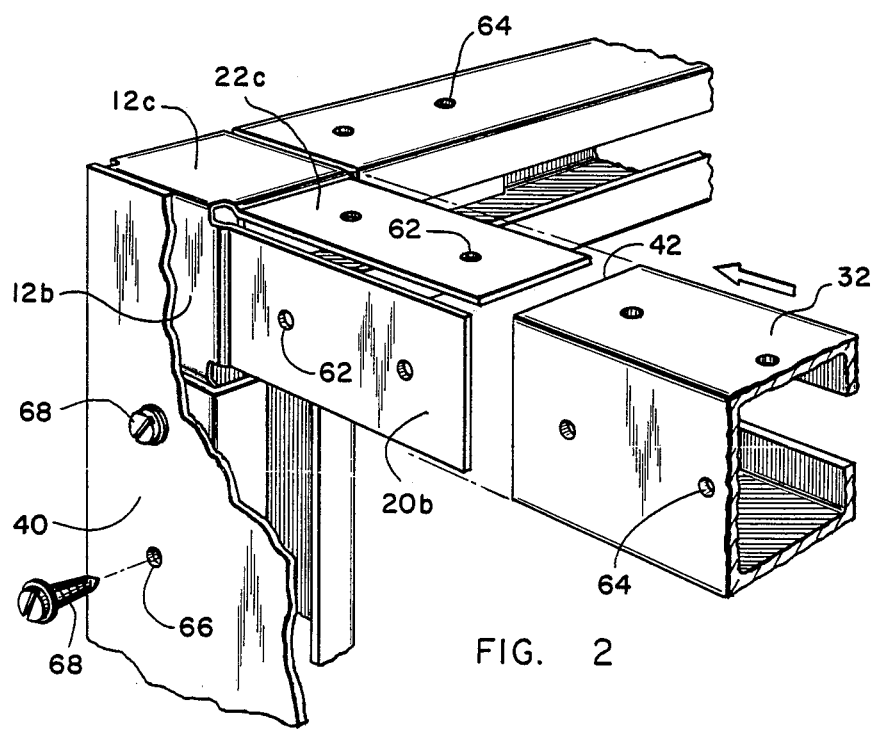
FIG. 2 is an exploded perspective view of the corner of an air conditioning cabinet constructed with the corner member of the present invention.
Figure 3:
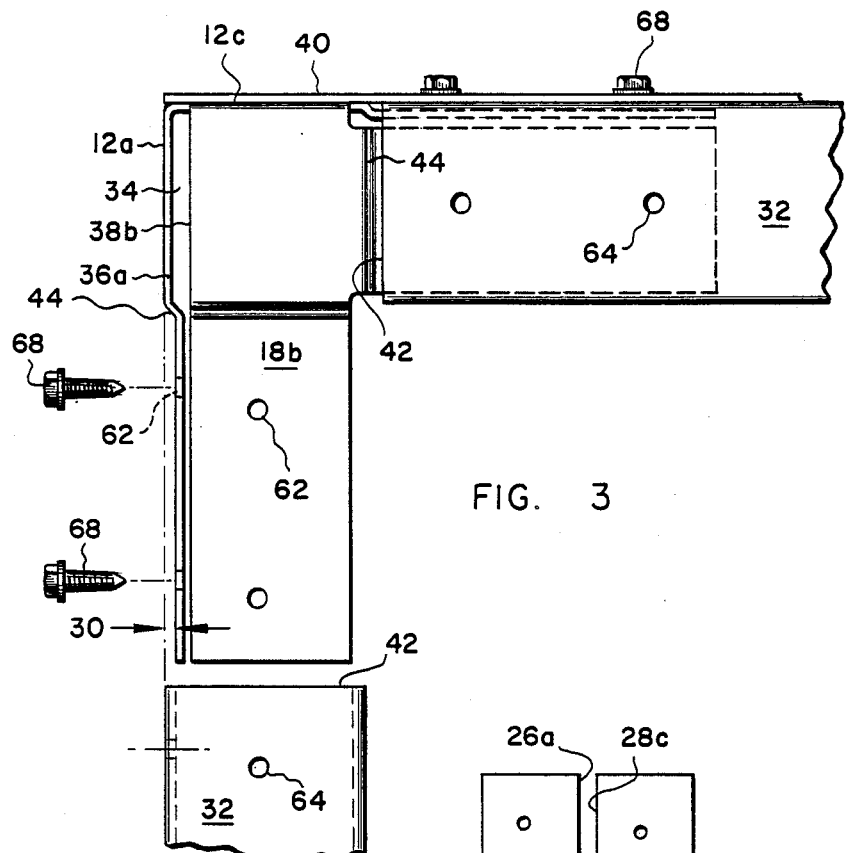
FIG. 3 is a side view of the corner member of the present invention better illustrating the offset of the legs from the sides of the corner portion from which they extend as well as the interaction of the corner member with other cabinet structural components.

Referring simultaneously to FIGS. 1, 2, and 3, corner member 10 includes a three sided corner portion 12 having sides 12a, 12b and 12c. Extending from corner portion 12 are legs 14a and 16a. Legs 18b and 20b extend from side 12b while legs 22c and 24c extend from side 12c.

It will be noted that legs 14a and 16a comprise a first pair of legs characterized by their extension, at right angles from and in the same plane as each other, from a single first side 12a of corner portion 12. Similarly, legs 18b and 20b comprise a pair of coplanar legs extending, at right angles from each other, from single corner portion side 12b. Finally, legs 22c and 24c are characterized as a pair of coplanar legs which extend from single side 12c of corner portion 12 at right angles to each other.

Legs 14a, 16a, 18b, 20b, 22c and 24c can also be grouped in discrete other pairs which are characterized by their extension, in the same direction and in planes which are at 90° angles with respect to each other, from different ones of the single sides 12a, 12b and 12c of the corner portion. That is, legs 14a and 24c can be characterized as a pair of 90° attachment legs which extend in a first direction X from corner portion 12 while legs 16a and 18b are a pair of attachment legs which extend in a direction Y from corner portion 12 and legs 20b and 22c are a pair of attachment legs which extend from corner portion 12 in a third direction Z.

Note that each of the first mentioned pair of legs (which are attached to and extend from a common side of corner portion 12) are coplanar and at right angles with each to other. These first mentioned pairs of legs, each of which extends from a common side, lie in a plane parallel to the plane of the side of corner portion 12 from which they extend.

Note also that each of the second mentioned pairs (categorized as attachment legs extending in a common direction from different side of corner portion 12) are disposed in planes which are nominally at 90° angles with respect to each other and that each leg of an attachment pair has an edge, such as, for example, edges 26a of leg 14a and 28c of leg 24c, which is adjacent but physically separated from an edge of the other leg in that attachment pair to form an open seam 29 therebetween.

Referring primarily now to FIG. 2, it will be seen that corner member 10 is adapted to be connected to a structural member such as channel 32. It will be appreciated that channel 32 is but one example of the numerous types of structural elements which can be accommodated by and attached to corner member 10. As earlier mentioned, structural members that are square, rectangular, angled or the like in cross section can be attached to corner member 10 so long as they have a surface or surfaces which are dimensioned to abut at least one, but preferably two, legs of the corner member.

Because different structural members such as channel 32 will typically be attached to each of the adjacent but separate legs which extend in a common direction from corner portion 12 and because one seam 34 of corner portion 12 itself, which is created by the juxtaposition of edges 36a and 38b of sides 12a and 12b of the corner portion, is an open seam created therebetween, corner member 10 is, as a whole, three dimensionally flexible in the X, Y and Z directions illustrated in FIG. 1. This flexibility facilitates rapid cabinet assembly by making the corner member self-fixturing with respect to the attachment, one each to a different one of the three 90° attachment pairs of legs, of structural members, such as channels 32, to it.

This self-fixturing feature of corner member 10 is extremely important in the manufacturing process in that it eliminates the need to physically bend, twist or otherwise force components of the cabinet such as other framework members or its generally planar sheet metal sides 40 into compliance with each other in a manner which can distort one or more of the cabinet components and the waste of labor and materials. Corner member 10 therefore promotes ease and efficiency of the cabinet fabrication process while at the same time minimizing the likelihood that a cabinet component will be distorted in that process by tolerating and accommodating the slight misalignments which are, essentially inherent in the fabrication of structures of this size and weight.

Still referring primarily to FIG. 2, it will be noted, for example, that legs 22c and 20b of member 10 are disposed and become ensconced within channel 32 during the assembly process. That is, the legs of member 10 are dimensioned to fit snugly against and within the interior walls of the channel member. Channel member 32 is simply and quickly pushed onto an over legs 20b and 22c until end 42 of channel member 32 abuts the radius 44 of member 10 which is created by the offset of the legs from the sides from which they extend.

Referring additionally now to FIG. 3, it will be appreciated that offset 30 is preferably dimensioned so as to be the same as the thickness of the material from which channel 32 is fabricated, the outward facing sides of channel member 32 will be coplanar with the side of corner portion 12 with which they abut. The result is an essentially smooth and near-seamless cabinet framework that cleanly and efficiently accommodates the attachment of the cabinet side panels which will typically be fabricated from a thinner gauge of flat sheet metal.

Figure 4:
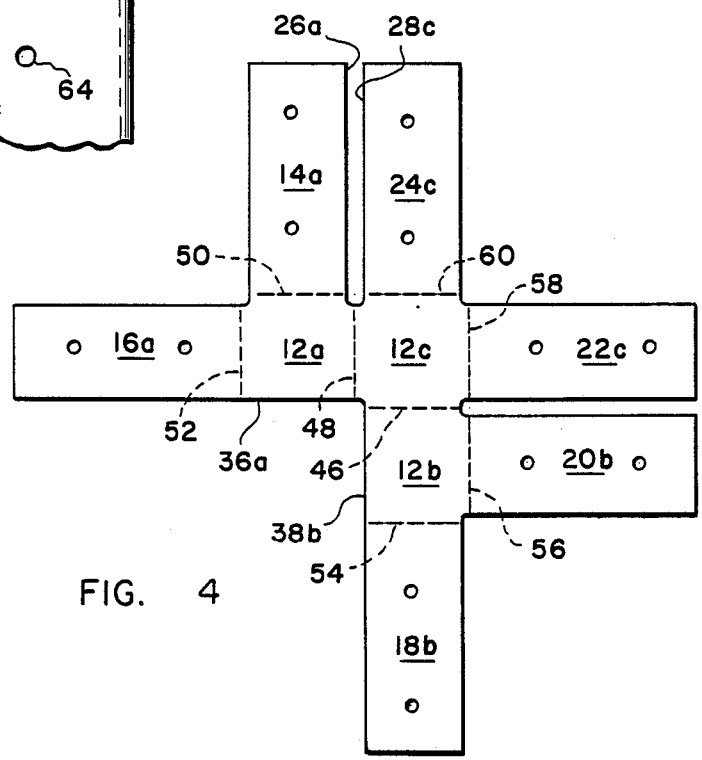
FIG. 4 illustrates the unitary blank piece of material from which the corner member of the present invention is fabricated.

Referring now to FIG. 4 it will be appreciated that corner member 10 is efficiently and economically fabricated from a unitary piece of material, such as a heavier gauge sheet metal. FIG. 4 illustrates each of legs 14a, 16a, 18b, 20b, 22c and 24c as well as sides 12a, 12b and 12c of the corner member in their preformed shape. Likewise edges 26a and 26b of legs 14a and 24c are illustrated as are edges 36a and 36b of sides 12a and 12b which cooperate to form the open seam between two of the three sides of corner portion 12.

FIG. 4 additionally illustrates that in order to finally form corner member 10 a relatively simple and efficient stamping and bending process can be employed. Lines 46 and 48 represent lines at which 90° bends in the material must be accomplished. Lines 50, 52, 54, 56, 58 and 60 represent the locations at which radii 44 are formed in a stamping process that creates the offsets 30 of each leg from the side face of corner portion 12 from which it extends.

It will be appreciated that attachment holes 62 in corner member 10, attachment holes 64 in exemplary structural member channel 32 and attachment holes 66 in typical cabinet side member 40 can be pre-drilled and pre-located such that when channel member 32 is assembled onto a pair of attachment legs and when side 40 is placed thereover for attachment to the resulting cabinet framework, attachment holes 62, 64 and 66 all come into alignment so that corner member 10, channel 32 and side 40 are all capable of being rigidly attached to each other by a single fastener such as by sheet metal screw 68.

The framework created by member 10 in cooperation with other cabinet structural members such as channel 32 is extremely strong and rigid. This is particularly important with respect to those sides of an air conditioning cabinet which define large openings or from which heavy accessories hang. While the primary feature of corner member 10 is its self-fixturing nature which promotes ease and efficiency in cabinet assembly process and which accommodates slight misalignments, its ability to accommodate other structural members of varying cross sectional geometry, its relatively inexpensive cost of manufacture and the contribution it makes to an aesthetically pleasing final appearance in the finished cabinet product are likewise significant advantages.

While the corner member of the present invention has been described in the context of an air conditioning cabinet application, it will be appreciated that it has general application in the fabrication of cabinets and enclosures for other purposes. It will also be appreciated that sides 12a 12b and 12c of corner member 10 need not necessarily be square but can be rectangular and of different dimensions one from the other. While the present invention has been described in the context of a preferred embodiment, it will also be appreciated that its breadth should not be construed or limited other than by the language of the claims which follow.

What is claimed is:

1. An enclosure for housing heating, ventilating and air conditioning equipment and the like comprising:
    a plurality of corner members, each of said corner members having three sides and six legs, each of said three sides lying in a plane which is generally perpendicular to the planes in which the other two of said three sides lie and two of said three sides cooperating to define an open seam therebetween, each respective one of said six legs extending from one of said sides and pairing with a different one of said six legs, said different one of said six legs extending in the same direction as said respective one of said six legs but from one of said three sides other than the side from which said respective one of said legs extends, said respective and different ones of said six legs being disposed in perpendicular planes and cooperating to define a pair of attachment legs between which an open seam is defined;
    a plurality of connecting members, each of said connecting members having at least two sides, said two sides lying generally in perpendicular planes and being disposed so as to abut and overlie individual ones of said pairs of attachment legs of said corner members;
    a plurality of cover panels; and
    means for rigidly connecting said corner members, said plurality of connecting members and said plurality of cover panels to form a box-like housing.

2. The enclosure according to claim 1 wherein each one of said six legs and the sides of said corner member from which each individually extend lie in different but generally parallel planes so that an offset of a predetermined dimension exists therebetween.

3. The enclosure according to claim 2 wherein said corner member is comprised of a unitary piece of material.

4. The enclosure of claim 3 wherein said material is sheet metal.

5. The enclosure of claim 4 wherein said predetermined offset dimension is essentially equal to the thickness of said at least two sides of said connecting members.

6. The enclosure according to claim 5 wherein each of said three sides are square.

7. The enclosure according to claim 6 wherein each of said plurality of connecting members, said plurality of corner members and said plurality of cover panels define preformed attachment apertures which come into cooperative alignment to facilitate the rigid connection of said connecting members, said corner members and said cover panels.

8. The enclosure according to claim 7 wherein said connecting members are steel channel members and wherein said means for rigidly connecting comprise sheet metal screws.

9. A corner member for a cabinet which encloses heating, ventilating and air conditioning equipment and the like comprising:
    a three-sided corner portion, each of said three sides being disposed in a plane which is generally perpendicular to the planes in which the remaining two of said three sides lie and two of said three sides defining an open seam therebetween;
    three pair of legs extending one pair each from a common one of said three sides of said corner portion, individual legs of individual ones of said three pair of legs being disposed in a common plane and extending from said common one of said three sides at a 90° angle with respect to each other, individual legs of individual ones of said three pairs of legs being disposed adjacent an individual leg of a different one of said three pair of legs to define an open seam therebetween, said adjacent legs extending from said corner portion in the same direction and being disposed in planes which are generally perpendicular to each other.

10. The corner member of claim 9 wherein each pair of said three pair of legs and the common side from which they extend lie in offset parallel planes.

11. The corner member according to claim 10 wherein said three sides of said corner portion are square sides.

12. The corner member according to claim 11 wherein said member is comprised of a unitary piece of material.

13. The corner member according to claim 12 wherein said material is sheet metal.

14. The corner member according to claim 13 wherein each of said legs which comprise said three pair of legs defines at least one attachment aperture at a predetermined location thereon.

* * * * *